W. R. WELLER.
WRENCH.
APPLICATION FILED AUG. 11, 1916.
1,208,868.
Patented Dec. 19, 1916.
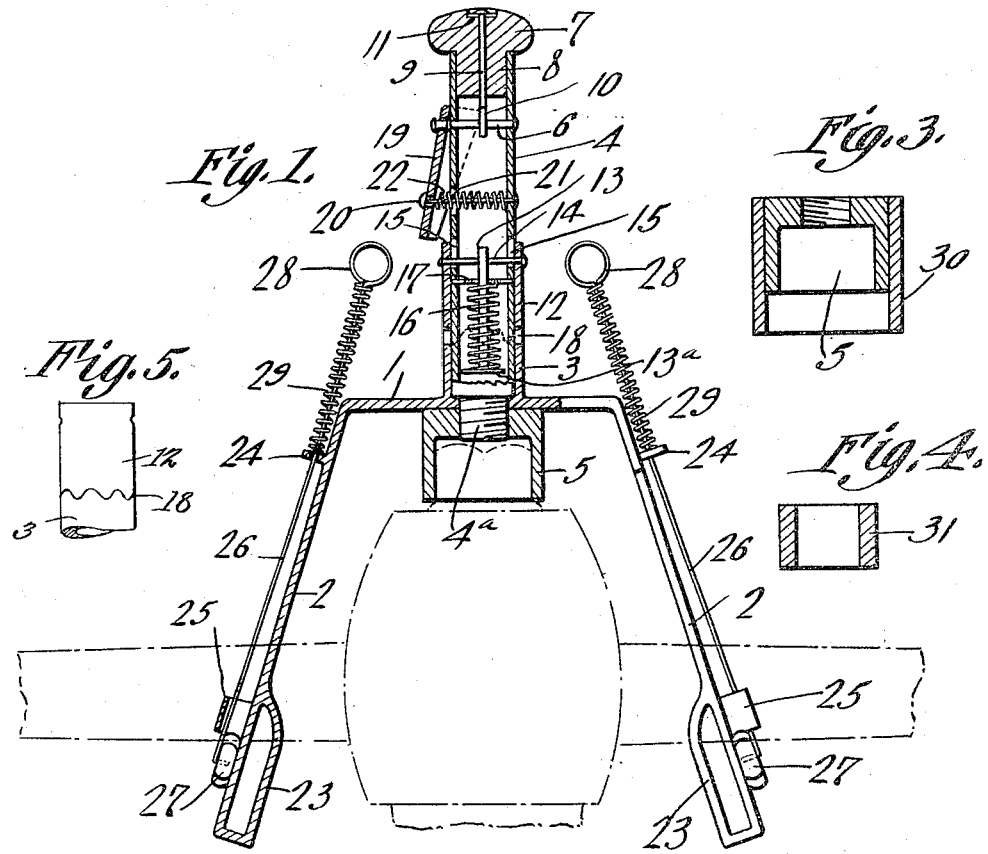
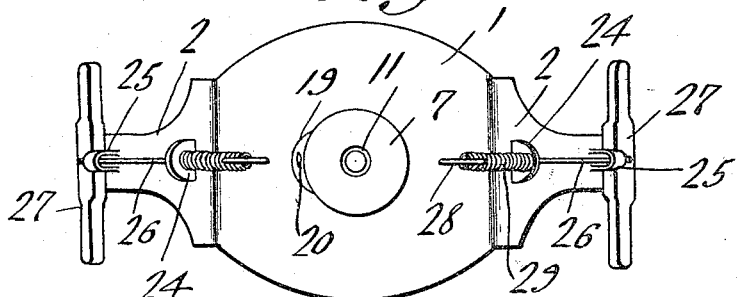
Witnesses
Inventor
W. R. Weller
by
Attorneys

UNITED STATES PATENT OFFICE.

WILLIAM R. WELLER, OF MILLSTONE, MARYLAND.

WRENCH.

1,208,868. Specification of Letters Patent. Patented Dec. 19, 1916.

Application filed August 11, 1916. Serial No. 114,431.

*To all whom it may concern:*

Be it known that I, WILLIAM R. WELLER, a citizen of the United States, residing at Millstone, in the county of Washington and State of Maryland, have invented a new and useful Wrench, of which the following is a specification.

The present invention appertains to wrenches, and is particularly an improvement over the wrench shown in my Patent No. 1,179,249, issued April 11, 1916.

It is the object of the invention to provide a wrench engageable to the wheel of a vehicle and having a nut socket to engage the nut of the axle spindle, whereby the wheel can be used as a lever or prize for loosening or tightening the nut in a convenient and efficacious manner.

One of the objects of the invention is the provision of a wrench of the nature indicated having novel means for attaching it to the spokes of a vehicle wheel, to hold the wrench in place.

Another object of the invention is to provide novel means for connecting the nut socket to the part which is applied to the wheel, whereby under certain conditions the parts can rotate relative to one another, while under other conditions the nut socket is compelled to rotate with the wheel.

It is also within the scope of the invention to provide a wrench such as above indicated which is simple and inexpensive in construction, and which serves its purpose in a satisfactory manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a median section of the wrench, portions being shown in plan. Fig. 2 is an end view of the wrench, Fig. 3 is a sectional detail showing an auxiliary nut socket applied to the main nut socket. Fig. 4 is a sectional view of another auxiliary nut socket for use with smaller nuts. Fig. 5 is a detail view illustrating the interengageable teeth of the collar.

The improved wrench embodies a sheet metal plate or member 1 having diverging tapered arms or prongs 2 adapted to be inserted between the spokes of a vehicle wheel, and the plate 1 also has a central collar or boss 3 projecting therefrom away from the arms 2. A tubular member 4 is journaled for rotation through the collar 3, and a detachable socket member 5 is threaded or otherwise attached to the reduced end $4^a$ of the tubular member 4 which projects through the plate 1. The socket member 5 rests against the plate 1 between the prongs 2, and various sizes of socket members can be used.

A pin or rivet 6 is engaged diametrically through the tubular member 4 adjacent the outer end thereof and a wooden or equivalent handle 7 has a reduced portion fitting within the last mentioned end of the member 4. A longitudinal pin 9 is engaged through the handle 7 and has an eye 10 at its inner end embracing the transverse pin 6, to anchor the handle to the member 4, and the outer end of the pin 9 has a washer or other means 11 for holding the handle 7 upon said pin.

A collar or sleeve 12 is slidable upon the member 4 between the ends thereof, and a diametrical pin 14 has its ends engaging the collar 12 and works within the diametrically opposite longitudinal slots 15 with which the member 4 is provided between its ends, and a longitudinal stem 13 has one end engaged with the pin 14 in any suitable manner and extends axially within the member 4 toward the socket member 5. The pin 14 can extend through the pin 13. A coiled wire expansion spring 16 is disposed around the stem 13 within the member 4 between a washer or disk $13^a$ upon the free end of the stem 13 and a guide 17 secured to the member 4 through which the stem 13 is slidable. The spring 16 normally moves the stem 13 outwardly to move the collar 12 against the boss or collar 3, and the adjacent ends of said collars are provided with interengageable rounded or sinuous teeth 18. In order to hold the teeth 18 of the two collars in engagement, a stop plate or arm 19 is disposed at one side of the member 4 and has one end loosely engaged upon one protruding end of the pin or rivet 6, whereby the plate 19 can swing to and from the member 4, said plate 19 projecting toward the plate 1. When the plate 19 is swung against the member 4 to fit it snugly, the free end of the plate 19 abuts the respective end of the collar 12, thus holding said collar 12 against the collar 3, and preventing the collar 12 from moving away from the collar 3. A pin 20 is engaged with the member 4 between the collar 12 and pin 6 and projects through an aperture 21 in the opposite side of the member 4, the plate 19 having an aperture adjacent its free end receiving the pin 20, the ends of the pin 20 being headed. Thus, the pin 20 limits the movement of the plate 19 away from the member 4, and a coiled wire expansion spring 22 is disposed around the pin 20 between the plate 19 and the opposite wall of the member 4, to normally swing the plate 19 away from the member 4, as seen in Fig. 1, whereby the collar 12 can move freely away from the collar 3 against the tension of the spring 16.

The ends of the arms or prongs 2 are bent back inwardly and secured by welding, riveting or otherwise fastening them, to provide the wedge-shaped loops 23 which are insertible between the spokes of a wheel. The prongs 2 have outstanding apertured guide ears 24 adjacent their butt ends, and are provided adjacent their free ends with guide sleeves 25. A pair of rods 26 is slidable through the ears 24 and sleeves 25 upon the outer sides of the prongs 2, and holding bars or members 27 are pivotally engaged between their ends with the ends of the rods 26 remote from the handle 7. The bars 27 bear slidably against the prongs 2, and can swing into alinement with said prongs, or at right angles therewith. The rods 26 have finger rings 28 at those ends adjacent the handle, and coiled wire expansion springs 29 are disposed upon the rods 26 between the ears 24 and rings 28, tending to move the rods 26 away from the free ends of the prongs 2, whereby to move the bars 27 against the guide sleeves 25.

In applying the wrench to a wheel and the nut which retains it upon the axle spindle, the rods 26 are moved against the tension of the springs 29, to move the holding bars 27 away from the sleeves 25, and said bars 27 are then swung into alinement with the prongs 2, whereby they can be readily inserted between the spokes of the wheel, the socket member 5 being simultaneously applied to the nut. The bars 27 are then swung at right angles with the prongs 2 so as to extend across certain of the spokes, and the rods 26 being released will bring the springs 29 into play, whereby the bars 27 are drawn against the spokes, and the prongs 2, and plate 1 move toward the wheel to hold the socket member 5 upon the nut. By moving the plate 19 against the member 4, the collar 12 is held in engagement with the collar 3, and then by rotating the wheel, the collar 12 will rotate with the collar 3 of the plate 1, and this will cause the member 4 to rotate whereby to rotate the nut, to unscrew it from the spindle. When the wheel is rotated or swung in the opposite direction, the nut will be screwed upon the spindle, and during this operation of the wrench, it is preferable to release the plate 19 whereby the collar 12 can if necessary, move away from the collar 3. The teeth 18 in being interengaged, and the collar 12 being held against the collar 3 under the action of the spring 16, will cause the collar 12 to rotate with the collar 3 so that the nut is screwed home, but when the nut stops, the collar 12 will be moved away from the collar 3 by the cam action of the teeth 18 thus preventing the nut being screwed too tightly into place, which is objectionable. This feature is also of advantage when the wheel is spun or when the vehicle is moved for screwing the nut into place, since if the nut were attached rigidly to the wheel, there would be a possibility that the wrench, wheel or other part would become broken, when the nut could rotate no farther. When a larger nut is to be accommodated, an auxiliary socket member 30 can be slipped upon the socket member 5 to receive a larger nut, and when a smaller nut is to be rotated, a smaller socket member 31 can be slipped within the socket member 5.

Having thus described the invention, what is claimed as new is:—

1. A wrench embodying a plate having prongs to pass between the spokes of a wheel, said prongs having guides, rods slidable through the guides longitudinally of the prongs, spring means for moving the rods away from the ends of the prongs, a holding member pivoted between its ends to the end of each rod and adapted to be swung into alinement with the rod to pass between the spokes, and to be swung at right angles with the rod so that the opposite ends of said member are engageable with spokes at opposite sides of the respective prongs, and a socket member carried by the said plate, said holding members being moved toward the guides by the tension of the spring means.

2. A wrench embodying a plate having prongs to pass between the spokes of a wheel, said prongs having guides, rods slidable through said guides and having finger pieces at those ends remote from the free ends of said prongs, holding bars pivoted between their ends to the other ends of said rods and resting slidably against the prongs adjacent their free ends, springs for moving said rods to move said bars toward the guides, and a socket member carried by said plate.

3. A wrench embodying a plate having means for engaging a wheel and having a collar provided with teeth, a member rotatable in said collar and having a socket member, a second collar slidable on said rotatable member and having teeth interengageable with the aforesaid teeth, and a swinging member pivotally connected with the aforesaid rotatable member adapted to be swung thereagainst with its free end abutting the second mentioned collar to hold it in engagement with the first mentioned collar.

4. A wrench embodying a plate having means for engaging a wheel and having a collar provided with teeth, a tubular member projecting through said collar and having a socket member at one end, a second collar slidable upon the tubular member and having teeth engageable with the aforesaid teeth, a stop plate pivotally connected with the tubular member and projecting toward the first mentioned plate, the free end of the stop plate being adapted to abut against the second mentioned collar to hold it in engagement with the first mentioned collar, a pin slidable through said stop plate adjacent its free end and engaged with the opposite wall of the tubular member, the tubular member having an aperture through which said pin extends, and a coiled expansion spring upon said pin between the stop plate and opposite wall of the tubular member.

5. A wrench embodying a plate having means for engaging a wheel and having a collar, a tubular member rotatable within said collar and having a socket member at one end, a second collar slidable upon the tubular member, the adjacent ends of the two collars having interengageable sinuous teeth, the tubular member having opposite longitudinal slots, a pin projecting through said slots and engaged with the second mentioned sleeve, a stem within the tubular member engaged with said pin, a guide within the tubular member through which said stem is slidable, and a spring between said guide and stem for moving the second mentioned collar against the first mentioned one.

In testimony that I claim the foregoing as my own, I have hereto affixed my signature in the presence of two witnesses.

WILLIAM R. WELLER.

Witnesses:
FRANK I. MELLOTT,
THEODORE P. JENKINS.

Copies of this patent may be obtained for five cents each, by addressing the "Commissioner of Patents, Washington, D. C."